United States Patent
Altemark (10) Patent No.: US 7,571,013 B2
(45) Date of Patent: Aug. 4, 2009

(54) METHOD FOR OPTIMIZING OPERATIONAL PARAMETERS ON WIND FARMS

(75) Inventor: Jens Altemark, Rendsburg (DE)

(73) Assignee: REpower Systems AG, Hamburg (DE)

(*) Notice: Subject to any disclaimer, the term of this patent is extended or adjusted under 35 U.S.C. 154(b) by 135 days.

(21) Appl. No.: 11/667,784

(22) PCT Filed: Nov. 22, 2005

(86) PCT No.: PCT/EP2005/012488

§ 371 (c)(1),
(2), (4) Date: May 15, 2007

(87) PCT Pub. No.: WO2006/056403

PCT Pub. Date: Jun. 1, 2006

(65) Prior Publication Data

US 2008/0103611 A1    May 1, 2008

(30) Foreign Application Priority Data

Nov. 22, 2004    (DE) .................. 10 2004 056 255

(51) Int. Cl.
*G05B 13/02* (2006.01)
*F03D 7/04* (2006.01)
(52) U.S. Cl. .................. 700/34; 290/44; 700/287
(58) Field of Classification Search .......... 700/286, 700/287, 33–35; 290/44
See application file for complete search history.

(56) References Cited

U.S. PATENT DOCUMENTS 4,994,684 A * 2/1991 Lauw et al. .......... 290/44

7,101,152 B2 * 9/2006 Wobben .......... 416/1
2003/0057703 A1    3/2003 Howes et al.

FOREIGN PATENT DOCUMENTS

| DE | 199 34 415 | 2/2001 |
| DE | 100 11 393 | 9/2001 |
| DE | 101 27451 A1 | 12/2002 |
| DE | 103 23 785 | 12/2004 |

OTHER PUBLICATIONS

Mosetti et al., (1994) "Optimization Of Wind Turbine Positioning In Large Windfarms By Means Of A Genetic Algorithm", *Journal of Wind Engineering and Industrial Aerodynamics* 51(1): pp. 105-116.

(Continued)

*Primary Examiner*—Albert DeCady
*Assistant Examiner*—Steven R Garland
(74) *Attorney, Agent, or Firm*—Morrison & Foerster LLP (57) ABSTRACT

A method for optimization of operating parameters of a wind energy installation defines an upper and a lower interval limit value for a parameter to be optimized. The method includes carrying out a cycle with alternate operations of the wind energy installation with the interval limit values, with a data record in each case being produced with a target variable over a variable number of repetitions. The data records relating to the interval limit values are evaluated to form a quality measure, and the interval limit value with the poorer quality measure is identified. Then, at least the interval limit value with the poorer quality measure is replaced by shifting through a step value Δ in a direction of another interval limit value. The cycle is then repeated.

17 Claims, 5 Drawing Sheets

OTHER PUBLICATIONS

Farret et al., (2001) "Sensorless Active Yaw Control For Wind Turbines", *The 27th Annual Conferences of the IEEE Industrial Electronic Society*: pp. 1370-1375.

International Preliminary Report on Patentability dated May 22, 2007, directed to counterpart International application No. PCT/EP2005/012488.

* cited by examiner

METHOD FOR OPTIMIZING OPERATIONAL PARAMETERS ON WIND FARMS

REFERENCE TO RELATED APPLICATIONS

This application is a national stage application under 35 USC 371 of International Application No. PCT/EP2005/012488, filed Nov. 22, 2005, which claims the priority of German Application No. 10 2004 056 255.5, filed Nov. 22, 2004, the contents of both of which prior applications are incorporated herein by reference.

FIELD OF THE INVENTION

The invention relates to a method for optimization of operating parameters of wind energy installations, in particular with respect to those of the rotor/generator system, in which an upper and a lower interval limit value are predetermined for the parameter to be optimized.

BACKGROUND OF THE INVENTION

Modern wind energy installations are complex structures which are operated with the aid of a complex control system. The control system is in this case designed to operate as well as possible various wind energy installation systems in accordance with the requirements of the operator of the wind energy installation and the operator of the grid system to which the wind energy installation is connected. In this case, the expression as well as possible generally means that a high energy yield is achieved, although attention must also be paid to the noise emission being as low as possible, to a low load on the drive train, and on the load-bearing structure, and furthermore, to good compatibility with the electrical grid system. The rotor/generator system is particularly important in this context. The rotor together with its blades is of critical importance for the absorption of energy from the wind, that is to say for the conversion of wind energy to mechanical energy, which is in turn converted to electrical energy by the generator. In addition to the design, one important parameter of the rotor relates to the rotor blade length and the profile shape of the rotor blades, the pitch angle which is generally variable. The pitch angle is defined as the angle between a representative profile chord and the rotor plane. The pitch angle is extraordinarily important for definition of the aerodynamic conditions on the rotor blade. It is the governing factor for the flow conditions between the rotor blade and the apparent wind acting on the rotor blade. The apparent wind comprises the true wind and the wind induced by the movement of the rotor blade. The strength and direction of the apparent wind therefore depend on the rotation speed of the rotor, which is in turn dependent on the speed of the true wind and the pitch angle. This therefore results in a closed-loop system for rotor rotation speed control. It is therefore difficult to find optimum values for the pitch angle, as a parameter.

Additionally, values have been used as presets for the rotor blade pitch angle determined in advance during operation of wind energy installations. One disadvantage of this method is that it is highly dependent on the accuracy of the initial calculation. Furthermore, this method is sensitive to discrepancies in the rotor blades from the ideal shape for example resulting from unavoidable manufacturing tolerances. This method therefore does not lead to satisfactory overall results. Furthermore, it is also known from obvious prior use for long-term measurements to be carried out on the wind energy installation, and for appropriate correction values to be derived from them. This avoids the above disadvantages, but this method is time-consuming and costly.

It is also known (DE-A-101 27 451) for parameter variations to be carried out controlled by a timer on a cyclic basis. The method is based on the idea of varying one parameter within predetermined limits until an optimum value is found. One disadvantage of this method is that it is susceptible to finding a local optimum. This conceals the risk of a global optimum not being identified. Furthermore, the method has the disadvantage that it cannot distinguish between stochastic fluctuations in the wind strength and wind direction and real improvements resulting from the changed parameter settings. The method therefore does not always provide satisfactory results.

The invention is based on the object of improving a method of the type mentioned initially such that good optimization is achieved in conditions which are made more difficult by stochastic fluctuations. The solution according to the invention lies in the features of the invention as disclosed broadly herein. Advantageous developments are the subject matter of the specific embodiments disclosed below.

According to the invention, in the case of a method for optimization of operating parameters of a wind energy installation, in particular with respect to its rotor/generator system, a cycle is predetermined with an upper and a lower interval limit value being defined for a parameter to be optimized, in which cycle the wind energy installation is operated alternately with the interval limit values, with one data record in each case being produced with a target variable, to be precise over a variable number of repetitions, evaluation of the data records relating to the interval limit values with a quality measure being formed, identification of the interval limit value with the poorer quality measure, replacement of at least this interval limit value by shifting through a step value $\Delta$ in the direction of the other interval limit value, and repetition of the cycle.

The invention is based on the idea of using an iterative process for parameter optimization. The invention has found that an iterative process with a sufficiently large number of samples makes it possible to compensate for stochastic fluctuations so that they virtually no longer have any disturbing effect on the result. In contrast to the known methods, the statistical method according to the invention is not negatively influenced by stochastically fluctuating variables, such as the wind speed and direction. It is therefore very good in practical application, even in difficult conditions.

The concept of the method is of captivating simplicity, and initially requires only two interval limit values for the parameters to be optimized. Building on this, the method is carried out automatically and is able to determine not only an optimum value located between the interval limit values but also an optimum value located outside the interval limit values. The invention achieves this by alternately and successively measuring and storing the desired target parameter relating to the interval limit values. This interaction is repeated a specific number of times. This number can be predetermined as a fixed number or may be variable, depending on the parameter and the optimization quality already achieved, as expressed by the quality measure. Furthermore, the values for the target variable are each evaluated for the two interval limit values, and a quality measure is formed for each of the interval limit values, as a function of the result. The quality measure is a scale for the efficiency with which the wind energy installation is operating for the respective interval limit value. It is determined by comparison in order to establish which of the interval limit values results in the poorer quality measure. The associated interval limit value is the poorer, and the other is the better. The method provides for the poorer interval limit value to be replaced by a different value, which is changed by the variable step value Δ in the direction of the better interval limit value. The procedure is then repeated with the interval using the changed limits. Finally, this results at the end in an optimum value being determined for that parameter. This parameter is preferably the pitch angle of the rotor blades, to be precise for all jointly or individually for each rotor blade. For the method according to the invention, it is preferable for an optimum value for the setting of the rotor blades to be determined automatically. The invention means that there is no longer any need to measure the wind speed in order to calculate an optimum pitch angle. In addition, other parameters which are related to the wind speed and/or to the characteristics of the wind no longer need be measured (or only with less accuracy). The method according to the invention allows optimization without any measurement of wind parameters. In consequence, inaccuracies such as those which generally occur to a considerable extent when measuring the wind parameters (or which can be avoided only by highly complex extra measures), no longer have a negative effect on the operation of the wind energy installation. This is particularly important in the situation where wind energy installations are arranged relatively close in an area such as that which typically occurs in windparks. In this case, adjacent wind energy installations typically have a negative influence on the measurements of wind parameters, such as the wind strength or wind direction. Optimum operation of the wind energy installation is therefore virtually impossible. The invention is based on the surprising discovery that there is no need at all to measure these parameters. Instead of this, the respectively optimum pitch angle is determined by means of the method according to the invention in the respectively prevailing wind conditions, irrespective of the wind direction and strength. A large number of samples or iterations can admittedly lead to lengthening of the time that is required to carry out the method, but this is not of major importance in the case of an automated method, as envisaged by the invention.

The invention results in better utilization of the wind energy installation. This reduces yield reductions resulting from a non-optimum choice of the parameter to be optimized.

A number of expressions used in the following text need to be explained:

A parameter is a system coefficient which influences the system behavior. This may be a parameter of the mechanical system or of the electrical system, or a parameter of the control device.

The target variable to be optimized is a system variable. This results as a consequence of other variables and parameters. Examples of the target variable, are, inter alia, the electrical power output, the noise level emitted, the structural load on the machine resulting from bending and/or vibration loads, as well as variables relating to grid-system compatibility in particular such as flicker. The target variable need not necessarily be a scalar, it can also be composed vectorially from a plurality of variables.

The interval limit values can be predetermined directly at the start of the method. However, it is also possible to calculate the interval limit values, to be precise from an operating value ($\alpha_B$) and a scatter value ($\alpha_{OFF}$). The latter allows simple inclusion in an existing operating control system. In this case, the parameters as determined in the conventional manner by the operating control system are each used as a start value for the operating value ($\alpha_B$). There is then no need to separately determine a suitable value for starting the method according to the invention.

In general, both of the interval limit values will be changed at the end of a cycle. This is preferably done by changing the operating value. However, it is also possible to envisage a situation in which the aim is to additionally reduce the interval. The change to the better interval limit value is then carried out to a lesser extent, to be precise reduced by a reduction value $\delta$. The interval is thus reduced cyclically and successively until, in the end, the method according to the invention converges at an optimum value. It is also possible to provide for the reduction value to be negative. The range between the interval limit values then widens. This may be advantageous at the start of the optimization process when the aim is to quickly search through quite a wide interval.

The cycle is expediently repeated until a predeterminable termination criterion $\epsilon$ is reached. In this case, $\epsilon$ expediently represents a difference magnitude relating to the quality measure. If this magnitude is sufficiently small, then the optimization process can be ended. However, it is not absolutely essential to use the quality measure for the termination criterion. It is also possible to provide for the cycle to be repeated until the interval limit values have reached a separation of only $\epsilon'$.

The step width $\Delta$ and, if appropriate, the reduction value $\delta$ are expediently determined by means of a predictor. This has the advantage over rigid presetting that the predictor frequently makes it possible to achieve faster convergence of the method according to the invention towards an optimum value. Optimization processes which are known per se can be used for the predictor, for example genetic algorithms.

In one proven embodiment, the quality measure is calculated by addition. This is an evaluation and quality-measure formation process which can be calculated particularly easily and efficiently. If the aim is also to take account of the number of data items used, then an averaging process can also be provided. In this case, the expression an average should be understood in the wide sense; the expression covers not only the arithmetic mean but also other calculation methods, such as the geometric mean. It is self-evident that more complex statistical methods can also be provided, in particular those in which the data is weighted over a predeterminable time interval (for example by means of a rectangular or Hamming window).

It is frequently necessary to optimize only one target variable. However, it may also be necessary to optimize a plurality of target variables. In this case, the quality measure is expediently formed multidimensionally. This is preferably done in the form of a vector.

One parameter for the optimization process is preferably the rotor blade pitch angle and the target variable is the electrical power output. As explained initially, the pitch angle of the rotor blades is a significant criterion for the efficiency of absorption of mechanical energy in order to drive the generator from the wind energy. This is therefore a particularly important fact for the electrical power that is generated, and thus for the wind energy installation yield. On the other hand, however, the pitch angle is governed by the flow conditions between the apparent wind and the individual rotor blade, with the apparent wind in turn being governed by the true wind and the rotation speed of the rotor. The rotation speed of the rotor is in turn predominantly governed by the pitch angle. This therefore results in a closed-loop relationship, in which the optimization process according to the invention can be used particularly advantageously.

It is self-evident that the method can also be used for other parameters. By way of example, the generator torque characteristic can be used as a parameter. This likewise has a significant influence on the rotor rotation speed, and thus also on the blade pitch angle. Further expedient parameters are wind parameters, such as windvane offset for determination of inaccuracies or vortices in the area of a windvane of the wind energy installation. It is also possible to optimize other parameters, such as control parameters for control devices for the wind energy installation (for example PID regulators) or parameters for a control system for a converter for the wind energy installation (for example variance of the power, grid-system flicker or harmonics) using the method according to the invention.

It has been proven to use not only one but a plurality of target variables. If, by way of example, one target variable to be optimized is the electrical power output, then it is also possible additionally to use as a target variable a measure of the structural load, for example on the rotor blades, and of the noise emission, and possibly to additionally provide a parameter for the machine load (damage equivalence load).

The invention also relates to a wind energy installation for carrying out the method according to the invention. The wind energy installation has a pod which is arranged on a substructure that has a rotor which is arranged on its end face such that it can rotate, having a generator which is driven by the rotor in order to output electrical energy via a converter, with a control device and a measurement device being provided in order to carry out the method, having a microprocessor and a memory apparatus.

BRIEF DESCRIPTION OF THE DRAWINGS

The invention will be explained in more detail with reference to one exemplary embodiment, which is illustrated in the drawing, in which.

DETAILED DESCRIPTION OF THE INVENTION

Figure 1:
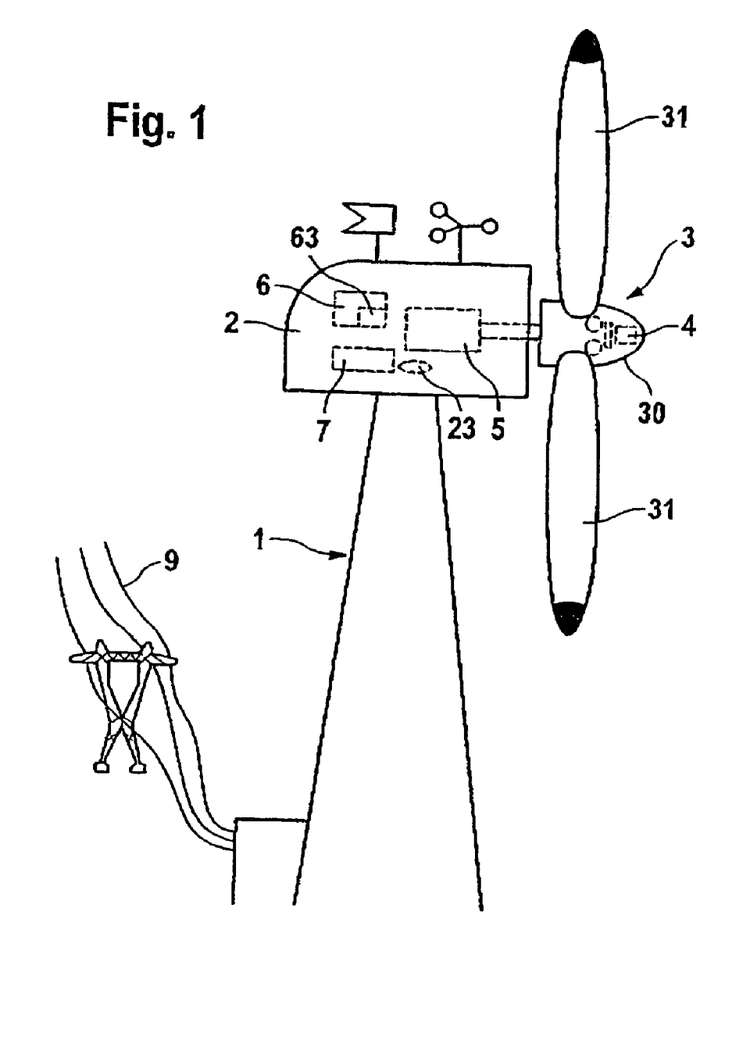
FIG. 1 shows an overall view of a wind energy installation for carrying out the method according to the invention.

A wind energy installation which is intended to carry out the method according to the invention has a substructure which is in the form of a tower 1 and has a machine house 2 fitted to it. Most of the major components of the wind energy installation are arranged in or on this substructure.

A rotor 3 is arranged on one end face of the machine house 2, such that it can rotate by means of a rotor shaft 50. Via this rotor shaft 50, the rotor 3 drives a generator 5 arranged in the machine house 2, possibly via a gearbox. The generator 5 may be in various forms, and may be a DC generator, a single-phase generator or a three-phase generator. Furthermore, it may be a synchronous machine or an asynchronous machine, with a single or double feed. The generator 5 is preferably in the form of a double-fed asynchronous machine. The generator 5 is connected to an electrical supply grid system 9 via a converter 7 and connecting lines which are not illustrated in any more detail. Furthermore, a control device 6 is provided, and controls the operation of the wind energy installation. A measurement device 23 is provided in order to determine the electrical power output. The measured electrical power is preferably the real power P, since this is a better measure than the volt-amperes or the wattless component of the power actually produced by the wind energy installation. However, it is also possible to provide for the electrical energy output to be used rather than the power. This has the advantage that integration is carried out automatically in the case of measurements over a relatively long time period. The meter that is provided in any case for the energy output in the wind energy installation (kilowatt-hours meter) can expediently be used for this purpose. This not only saves a separate sensor but automatically results in integration of the power signal, thus reducing undesirable noise in the measurement signal. It is also possible to use other parameters which represent a measure of the energy or power output from the rotor/generator system. In particular, it is possible to use the mechanical torque emitted from the rotor or the electrical torque produced by the generator, which can be used for formation of the efficiency measure, with or without rotation-speed assessment, depending on the operating range.

Figure 3:
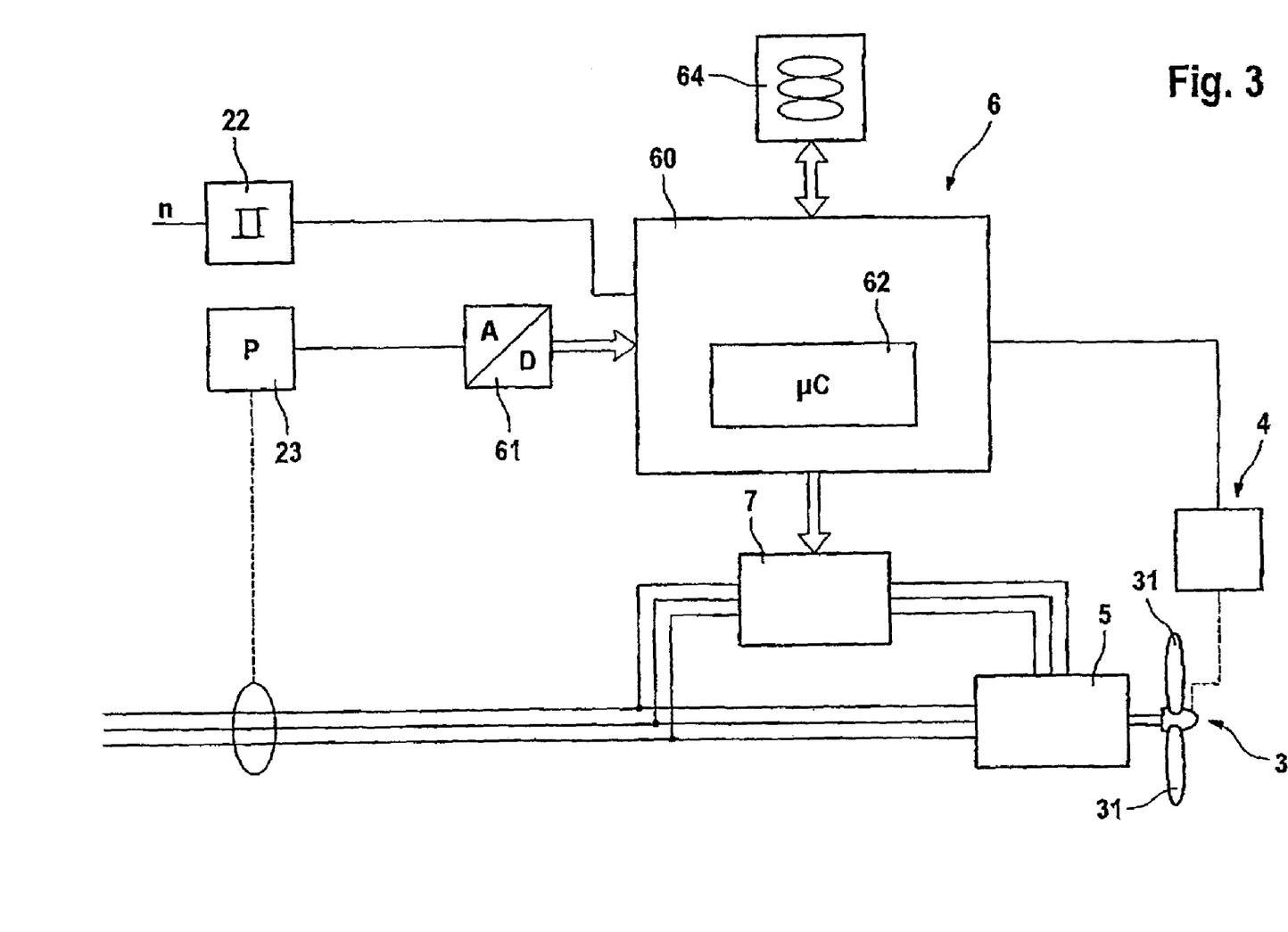
FIG. 3 shows a schematic block diagram of the wind energy installation illustrated in FIG. 1.

The design of the control device 6 is illustrated schematically in FIG. 3. The measurement device 23 for the electrical power output is connected to an analog/digital converter 61. This is designed to convert the signals supplied from the measurement device 23 to data in a data record at regular, variable time intervals. The data record is transmitted via a connecting line to a central control unit 60. The central control unit 60 has a microprocessor 62 for running the control and operating programs that are required for operation of the wind energy installation. A memory 64 is also connected to the central control unit 60. The generator 5 and the converter 7 are connected to outputs of the central control unit 60. Furthermore, a blade angle adjustment device 4 is connected to one output of the central control unit 60, and this will be explained in more detail in the following text.

Figure 2:
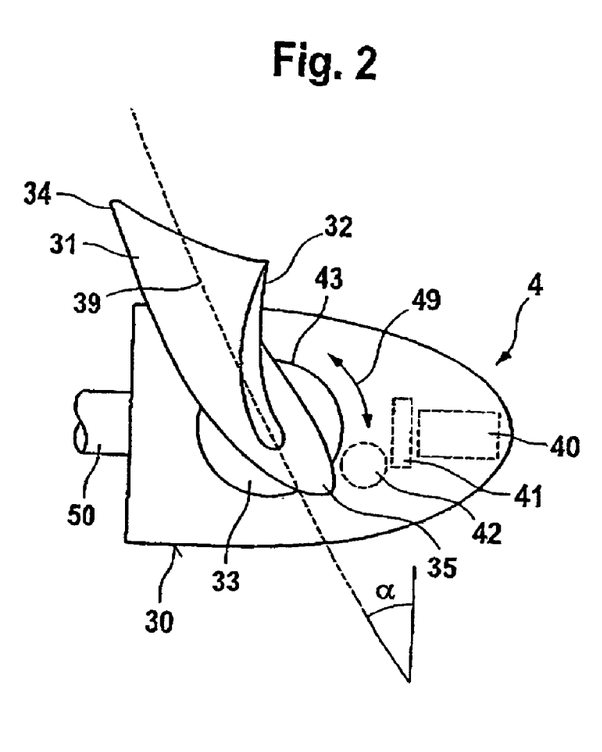
FIG. 2 shows a partial view of the rotor of the wind energy installation illustrated in FIG. 1.

The blade angle adjustment device 4 is used to adjust the pitch angle a of the rotor blades 31. As is illustrated in FIG. 2, the angle a is the angle included between a representative profile chord 39 of the rotor blade 31 and the rotation plane of the rotor, the normal to which is defined by the rotor shaft 50. FIG. 2 shows a view of the blade tip 32 of one of the rotor blades 31 illustrated in FIG. 3. The profile chord 39 connects the leading edge 35, which is located in the front area, to the trailing edge 34 of the rotor blade 31. The rotor blade 31 is anchored in the hub 4 by its blade root 33. The rotor blade 31 is twisted, such that the profile chord results in a pitch angle which becomes continuously greater starting from the blade tip 32 to the blade root 33. The blade root 33 preferably has a circular shape in the area of the hub 4, so that the rotor blade 31 can be pivoted about the center point of the circle. The blade adjustment device 4 has a drive motor 40, which is arranged in the tip of the hub 4 and on whose power-output shaft an angle gearbox is arranged, comprising a large gearwheel 41 and a pinion 42. The pinion 42 engages in a circumferential tooth system which interacts with the blade root 33. This means that the rotor blade 31 can be pivoted on operation of the drive motor 40, as is symbolized by the double-headed arrow 49 illustrated in FIG. 2.

Figure 4:
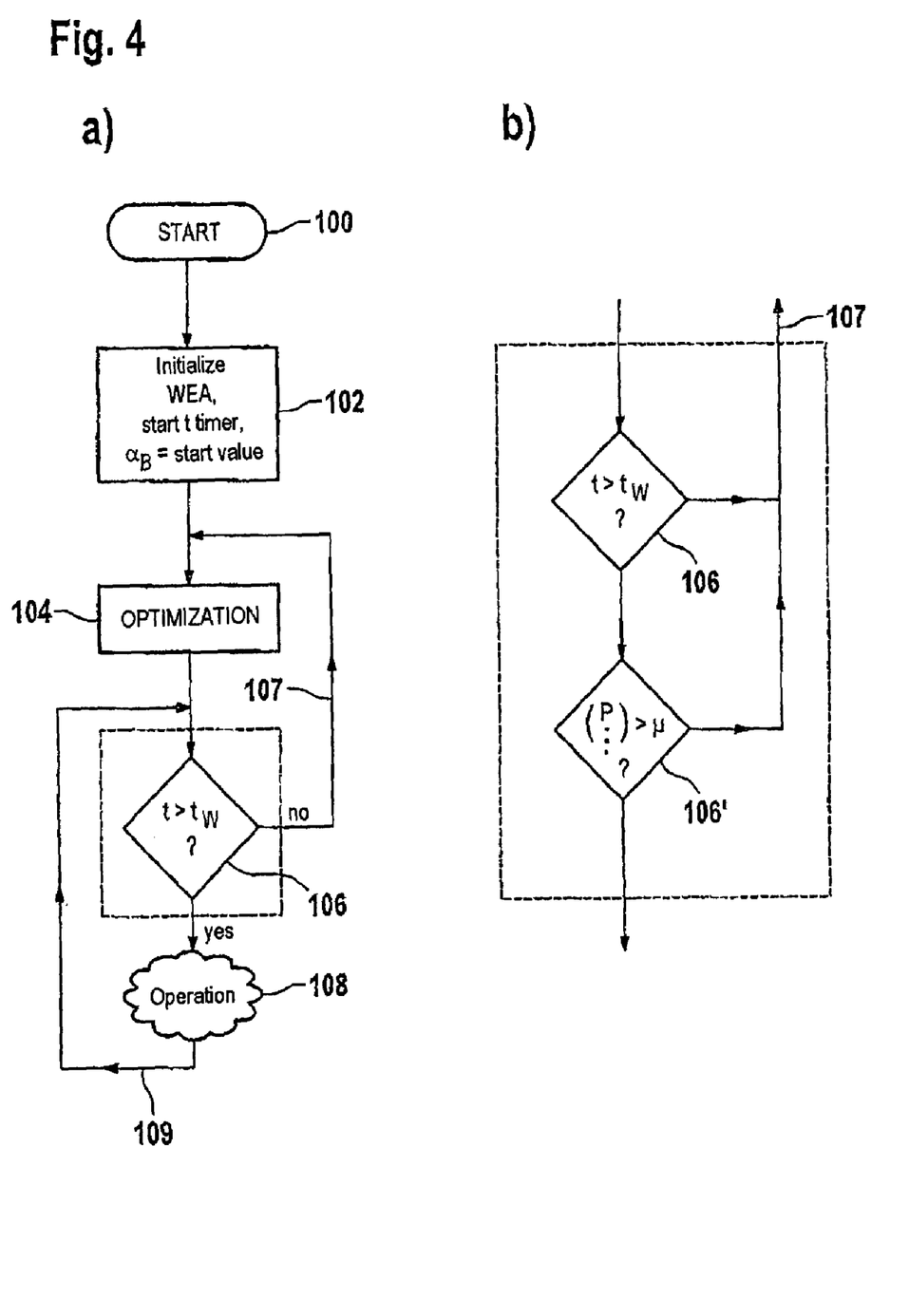
FIGS. 4a and 4b show an outline method for the optimization process according to the invention.

The procedure for the method according to the invention will now be explained, with reference to FIG. 4a. The wind energy installation is initialized at the start 100 of the method. This means that interval limit values are set, old data is deleted from memories and, apart from this, the wind energy installation is prepared for operation in a manner known per se. Initial steps for the invention during the initialization process 102 are the starting of a timer t and the definition of an operating value $\alpha_B$ for a parameter to be optimized as a first value, with which operation will be started. This value can be defined in a manner known per se, as would be done in a wind energy installation without using the method according to the invention. After initialization, the optimization process 104 according to the invention can commence.

Figure 5:
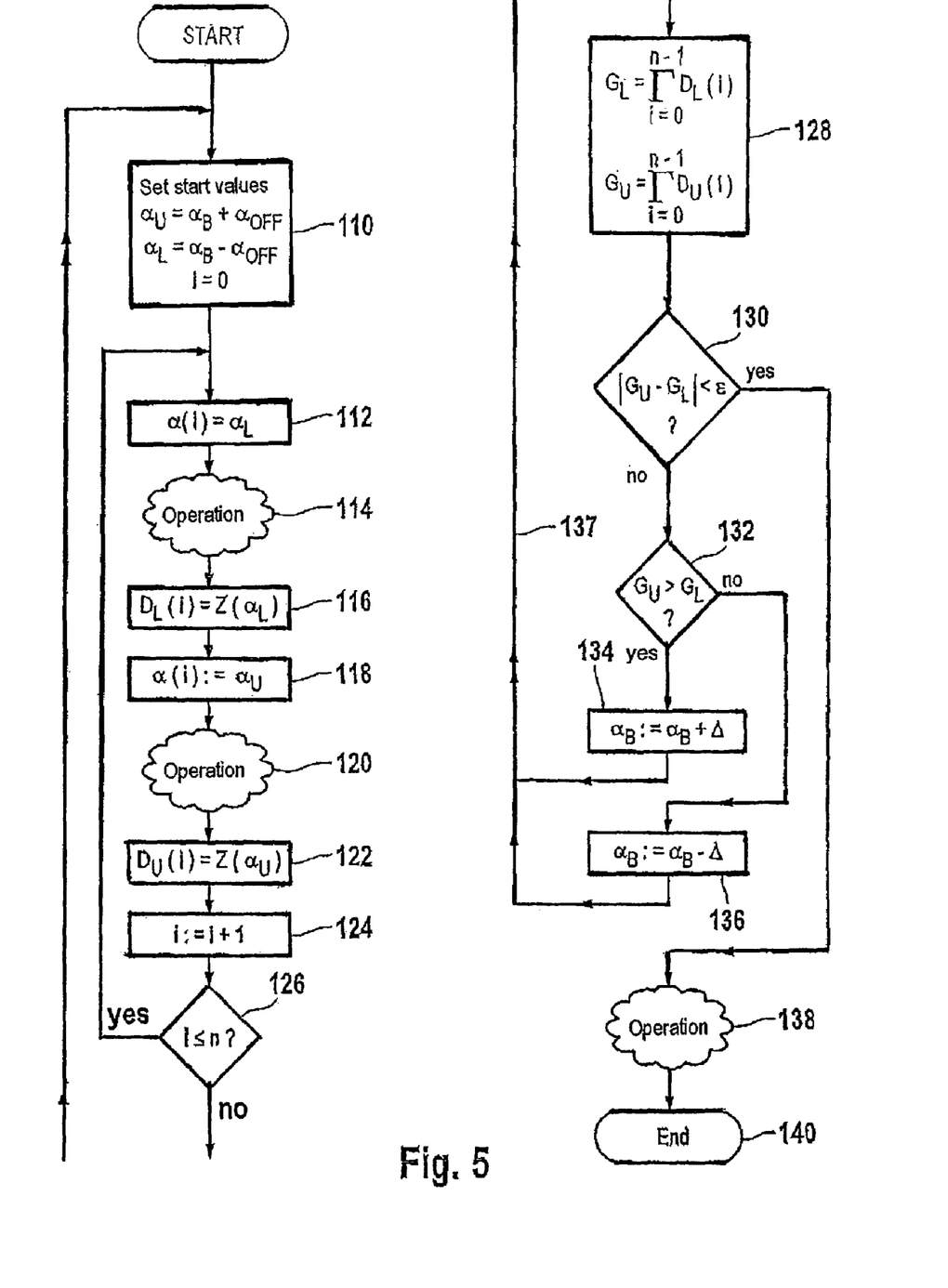
FIG. 5 shows a flowchart according to one exemplary embodiment of the optimization method according to the invention.

Reference is now made to FIG. 5. Starting from the operating value $\alpha_B$ an upper and a lower interval limit value $\alpha_U$ and $\alpha_L$, respectively, are each set in a first step 110, by adding an initial stress value $\alpha_{OFF}$ to the operating value $\alpha_B$, or subtracting it from the operating value $\alpha_B$. A sample counter i is set to zero. One of the two interval limit values is then set at the start of a cycle, the interval limit value $\alpha_L$ in the illustrated exemplary embodiment (step 112). The rotor blades 31 are set to a first value $\alpha(i)=\alpha_L$ by means of the adjustment device 4. The wind energy installation is then operated using this pitch angle (step 114). In this case, the control device 6 uses the measurement device 23 to record the electrical energy output over a specific time period, possibly as well as other parameters. The measurement vector $Z(\alpha_L)$ determined in this way is stored, after A/D conversion (if necessary) as a data record $D_L(i)$ in the memory 64 (step 116). In the next step 118, the pitch angle $\alpha(i)$ is changed to the upper interval limit value $\alpha_U$, and the wind energy installation is operated with this changed pitch angle (step 120). As before, a measurement vector is formed from data from the measurement device 23 and possibly from other parameters, and is stored in the memory 64, to be precise as a data record for the upper value $D_U(i)$ (step 122). This completes a sampling process with alternate operation of the wind energy installation using the upper and the lower interval limit value. In order to complete the process, the sample counter i is now incremented by one step (step 124). If the number of samples taken in this way is less than a predetermined limit n, then samples are once again taken from the step 112 until the number of samples is equal to the preselectable value n (step 126). By way of example, the values of n are in the range between 100 and 100 000, and a range between 1 000 and 10 000 has been particularly proven. The number is preferably variable, for example as a function of the variance of the parameters included in the data records. The time period over which a sample is taken is expediently chosen as a function of the parameter under consideration. In the illustrated exemplary embodiment, using the pitch angle $\alpha$, the time duration is expediently between 10 and 120 seconds. If a torque characteristic is used as the parameter, the time period is expediently between 30 seconds and 10 minutes, and for control parameters it is expediently between 10 seconds and 10 minutes. For more dynamic variables, such as converter parameters, a shorter time period is preferable, for example of between 10 milliseconds and 30 seconds. The choice of this time period is based on the knowledge that it is preferably chosen until non-stationary effect are eliminated, such as those caused by inertia of the air flow (dynamic wake).

After completion of the sampling process, the evaluation process starts with step 128. The data records contained in the memory 64 for the lower and upper pitch angles $D_L(i)$ and $D_U(i)$ are called up and evaluated for all (i) from 0 to n−1. The evaluation process may relate to all of the elements in the data record, or else only to some of them. In the first-mentioned case, the individual elements are expediently linked by means of weighting coefficients to form a scalar variable. In the second-mentioned case, the calculation is carried out using the magnitude directly. The quality measure may be a complex, multiple-parameter, non-linear function. However, a simple quality measure may also be provided, for whose formation there is no need to use all of the stored individual values. A quality measure such as this has the advantage that it can be formed continuously while the sampling cycle is being carried out. The measured values are in this case processed directly in order to form the quality measure. This has the advantage that there is no need to store the measured values. One example of a quality measure such as this is a value sum, for example for the energy fed into the grid system from a wind energy installation during one cycle, with the wind energy installation being operated in the region of the optimum tip-speed ratio. The energy values are integrated separately on the basis of the interval limit values; this can be done continuously during the measurement, so that there is no need for storage. In order to determine whether the wind energy installation is actually being operated in the region of the optimum tip-speed ratio while the samples are being taken, an operating-mode detector 22 is expediently provided. This is designed to use the rotation speed of the rotor 3 to determine whether the installation is being operated in this range. The detector 22 is expediently in the form of a threshold-value switch, having a lower rotation speed limit and an upper rotation speed limit, between which the operating range of optimum tip-speed ratio is located. The detector 22 does not necessarily need to use the rotation speed as an input signal, and the electrical power output from the wind energy installation can also be used for determination purposes. However, an appropriate status signal for the operating mode is also frequently already available in the machine control system 6. It is then sufficient to read this signal. There is then no need for any separate sensors. The detector 22 ensures that the only measured values which are used as samples for the statistical processes are those in which the wind energy installation has been operated in the region of the optimum tip-speed ratio. If this is not the case, then the sample is invalid, and cannot be used. It is rejected and the sampling process is repeated.

Further simplifications of the method according to the invention are possible. For example, the measurement device 23, the A/D converter 61 and the memory 64 do not necessarily need to be provided. The measure for the electromechanical quantity and, possibly, the other parameters that are used are frequently available in any case from the operating control system for the wind energy installation, to be precise in many cases already in the form of mean values, as well. There is then no need for any separate measurement and storage. The parameters can be further-processed directly using the method according to the invention.

At the end of step 128, values $G_L$ and $G_U$ are produced as quality measures for the two interval limit values. A check is carried out in a next step 130 to determine whether the two quality measures $G_U$ and $G_L$ are of equal magnitude (with a tolerance $\epsilon$), or not. If they are not equal, a check is carried out to determine which of the two interval limit values has the better associated quality measure. If the upper interval limit value has achieved the better quality measure, the operating value $\alpha_B$ is incremented by the step width $\Delta$ (step 134). If the lower interval limit value has achieved the better quality measure, then the operating value $\alpha_B$ is decremented by the step width $\Delta$ (step 136). After a backward jump 137, the process starts once again with the step 110, and is continued until an optimum value is finally achieved. This is determined by comparison of the two quality measures in step 130. In the event of a positive result, the optimization process has been successful, and a changeover is made to control operation 138. The optimization process thus reaches its end 140. The rest of the procedure is then as illustrated in FIG. 4*a*.

Returning now to FIG. 4a again, the wind energy installation is operated using the optimum value determined in this way (step 108). This is continued (return path 109) until a variable repetition time $t_w$ has elapsed (step 106). This is followed by a backward jump 107 in order to carry out the optimization process (104) again. The wait for a predeterminable repetition time to have elapsed in step 106 does not need to be the only criterion for repetition of the optimization process 104 according to the invention. Further criteria can alternatively or additionally be provided (see FIG. 4b). For example, FIG. 4b shows an extended form (step 106') according to which an investigation is additionally carried out into significant changes in one of the parameters used, for example the electrical power. If a limit value μ which can be preset is exceeded, then a backward jump 107 is also made even if the repetition time has not yet elapsed.

Figure 6:
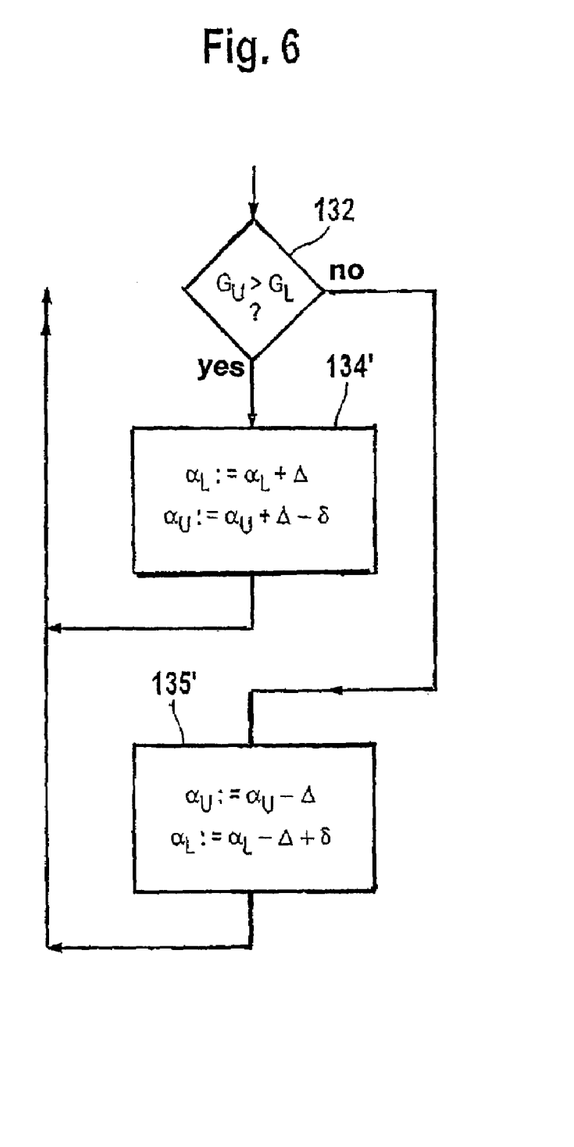
FIG. 6 shows a detailed view of a variation of the method illustrated in FIG. 5.

The invention is not restricted to the exemplary embodiment illustrated in FIG. 5. Various variations of the optimization process according to the invention are feasible. By way of example, FIG. 6 illustrates two mutually independent variations. The first relates to variation of the interval limit values during the iteration. In contrast to the situation in step 134, the operating value $\alpha_B$ and thus the two interval limit values are not shifted in step 134', but new interval limit values are fixed directly, and are each incremented by the step value Δ. The second variation relates to a change in the interval width. This can be done, for example in the manner illustrated in step 134'. The lower interval limit value $\alpha_L$ is increased by the step value Δ without being changed. The upper interval limit value $\alpha_U$ is, however, not increased by the same amount, but the magnitude is reduced by a reduction value δ. In this case, δ may also have the same value as Δ, that is to say the upper interval limit value would remain unchanged. The interval defined by the two start values is therefore reduced by the reduction value δ so that the method according to the invention converges more rapidly. In a corresponding manner, in step 135', the upper interval limit value is reduced by the step value Δ without being changed; while the lower interval limit value $\alpha_L$ is reduced only by Δ-δ.

It is self-evident that, in this variant, the interval limit values are not initialized once again in step 110. In a corresponding manner, it is alternatively also possible to provide for the scatter value $\alpha_{OFF}$ to be reduced by half the reduction value δ/2. This likewise results in a reduction in the interval by the reduction value δ.

Figure 7:
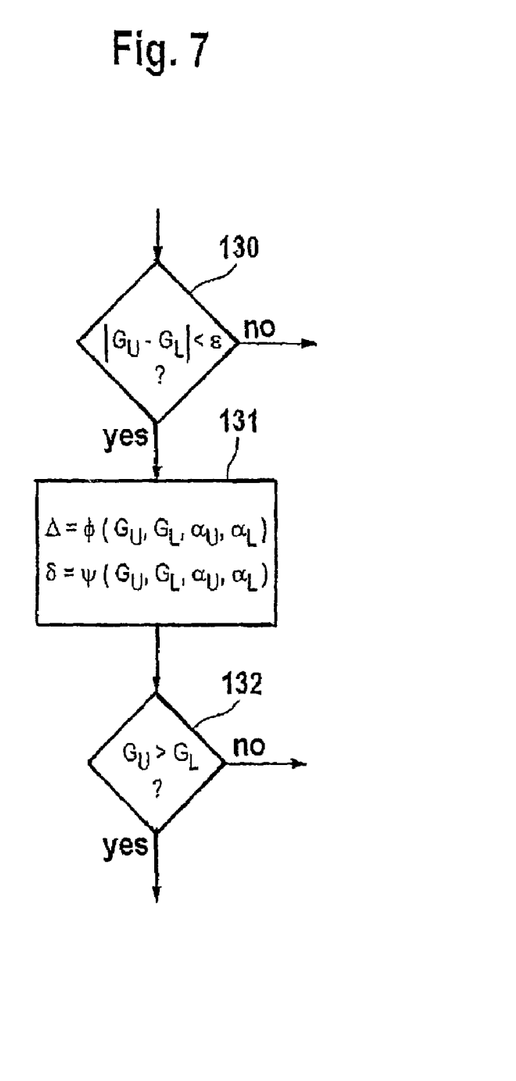
FIG. 7 shows a detailed view of a further variation of the method illustrated in FIG. 5.

A predictor is preferably used in order to define the step values Δ and, if appropriate, δ. As is illustrated in FIG. 7, two predictor functions Φ and Ψ are used for this purpose in step 131 on the basis of the determined values for the quality measure, as well as the interval limit values, if appropriate also including the data records contained in the memory 64. The step value Δ and the reduction value δ can be matched to the respective circumstances with the aid of the predictor functions. It is also possible to provide for the step value Δ and the reduction value δ to be determined on the basis of characteristics or of look-up tables, instead of by the use of a predictor. This has the advantage that empirical values relating to the choice of the step values Δ and the reduction values δ can be taken into account at the start and end of the optimization process according to the invention. Furthermore, this offers the advantage of simple calculation. If appropriate, it is thus possible to use higher step values at the start of the method, in order to achieve faster convergence, while smaller step values are used later on, in order to achieve greater accuracy.

The invention claimed is:

1. A method for optimization of an operating parameter of a wind energy installation by defining an upper interval limit value and a lower interval limit value for a parameter to be optimized, comprising:
    carrying out a cycle with alternate operation of the wind energy installation with the interval limit values, with the cycle, comprising operating the wind energy installation in one case with the upper interval limit value and operating the wind energy installation in another case with the lower interval limit value, with a data record in each case being produced with a target variable,
    evaluating the data records relating to the interval limit values to form a quality measure and determining a poorer quality measure,
    identifying an interval limit value with a poorer quality measure,
    replacing at least the interval limit value with the poorer quality measure by shifting through a step value Δ in a direction of another interval limit value, and
    repeating the cycle using a replaced interval limit value.

2. The method of claim 1, wherein values of the interval limit values are predetermined directly.

3. The method of claim 1, wherein the interval limit values are defined by an operating value ($\alpha_B$) and a scatter value ($\alpha_{OFF}$).

4. The method of claim 3, comprising varying the operating value ($\alpha_B$) through the step value Δ in order to vary at least the interval limit value with the poorer quality measure.

5. The method of claim 3, comprising reducing a separation between the interval limit values by reducing the scatter value ($\alpha_{OFF}$).

6. The method of claim 1 or 3, wherein the cycles are repeated until a predetermined termination criterion (ε) is reached.

7. The method of claim 1 or 3, wherein the cycles are repeated until the interval limit values have reached a separation of a value ε', which serves as a predetermined termination criterion.

8. The method of claim 1 or 3, comprising calculating the quality measure by addition.

9. The method of claim 1 or 3, wherein a data record includes a plurality of target variables, and the quality measure is formed multidimensionally.

10. The method of claim 9, wherein structural load and noise emission are additionally used as target variables.

11. The method of claim 1 or 3, wherein the parameter to be optimized is a pitch angle of a rotor blade and a target variable is electrical power or energy output.

12. The method of claim 11, wherein structural load or noise emission is additionally used as a target variable.

13. The method of claim 1, comprising reducing a separation between interval limit values by a reduction value δ.

14. The method of claim 13 comprising using a predictor to determine the step value Δ and the reduction value δ.

15. The method of claim 1, 3, 4 or 13, wherein the parameter to be optimized is a torque characteristic.

16. The method of claim 15, wherein structural load or noise emission is additionally used as a target variable.

17. A wind energy installation comprising a machine house arranged on a substructure and having a rotor which is rotatably arranged on an end face of the machine house, a generator which is driven by the rotor to output electrical energy via a converter, a control device which comprises a microprocessor, a memory device and a measurement device and is configured to optimize operating parameters of the wind energy installation by defining an upper interval limit value and a lower interval limit value for a parameter to be optimized, and the control device having programming causing:

carrying out a cycle with alternate operation of the wind energy installation with the interval limit values, with the cycle, comprising operating the wind energy installation in one case with the upper interval limit value and operating the wind energy installation in another case with the lower interval limit value, with a data record in each case being produced with a target variable, evaluating the data records relating to the interval limit values to form a quality measure and determining a poorer quality measure, identifying an interval limit value with a poorer quality measure, replacing at least the interval limit value with the poorer quality measure by shifting through a step value $\Delta$ in a direction of another interval limit value, and repeating the cycle using a replaced interval limit value.

* * * * *